(12) United States Patent
Cox (10) Patent No.: US 11,552,459 B2
(45) Date of Patent: Jan. 10, 2023

(54) METHOD OF IMPROVING AN ELECTRICAL LINK BOX

(71) Applicant: Electricity North West Property Limited, Stockport (GB)

(72) Inventor: Steve Cox, Cheshire (GB)

(73) Assignee: Electricity North West Property Limited, Stockport (GB)

( * ) Notice: Subject to any disclaimer, the term of this patent is extended or adjusted under 35 U.S.C. 154(b) by 455 days.

(21) Appl. No.: 16/608,509

(22) PCT Filed: Mar. 6, 2018

(86) PCT No.: PCT/GB2018/050568
§ 371 (c)(1),
(2) Date: Oct. 25, 2019

(87) PCT Pub. No.: WO2018/206909
PCT Pub. Date: Nov. 15, 2018

(65) Prior Publication Data
US 2020/0099200 A1 Mar. 26, 2020

(30) Foreign Application Priority Data
May 8, 2017 (GB) ...................................... 1707335

(51) Int. Cl.
*H02B 1/28* (2006.01)
*H02G 3/08* (2006.01)
(Continued)

(52) U.S. Cl.
CPC ................. *H02B 1/28* (2013.01); *B32B 1/02* (2013.01); *H02G 3/088* (2013.01); *H02G 5/08* (2013.01)

(58) Field of Classification Search
CPC ........ H02G 3/008; H02G 3/0412; H02G 3/08; H02G 3/081; H02G 3/088; H02G 1/28;
(Continued)

(56) References Cited

U.S. PATENT DOCUMENTS

| 4,088,827 A | * | 5/1978 | Kohaut | ................... H02G 3/185 174/484 |
| 4,223,175 A | * | 9/1980 | Crew | ................... H02G 3/0412 174/15.1 |

(Continued)

FOREIGN PATENT DOCUMENTS

| CN | 103917068 A1 | 7/2014 |
| CN | 2038004419 U | 8/2017 |

(Continued)

OTHER PUBLICATIONS

United Kingdom Intellectual Property Office Combined Search and Examination Report for Application No. GB170735.4, dated Jul. 7, 2017 (Electricity North West Limited) Jul. 7, 2017.

(Continued)

*Primary Examiner* — Steven A. Reynolds
*Assistant Examiner* — Prince Pal
(74) *Attorney, Agent, or Firm* — McAfee & Taft (57) ABSTRACT

There is provided a method of improving an electrical link box. The method includes steps of opening the electrical link box to provide access to a space within the electrical link box; inserting an electrical link box safety improving container into the space in the electrical link box; and closing the electrical link box; wherein the electrical link box safety improving container contains a filling material for mitigating blasts in the electrical link box. A safer electrical link box may be provided using the method.

21 Claims, 4 Drawing Sheets

(51) Int. Cl.
*H02G 5/08* (2006.01)
*B32B 1/02* (2006.01)

(58) Field of Classification Search
CPC ......... A43B 3/0026; G21C 9/001; F42D 5/05; F42D 5/045; B65D 2213/00; F42B 39/14; E04B 1/98
USPC ......... 220/3.9, 560.01, 592.2, 88.1; 206/591, 206/592, 584
See application file for complete search history.

(56) References Cited

U.S. PATENT DOCUMENTS

| | | | | |
|---|---|---|---|---|
| 4,235,836 A | * | 11/1980 | Wassell | C04B 28/26 106/605 |
| 4,276,332 A | * | 6/1981 | Castle | A62C 3/16 428/920 |
| 4,541,545 A | * | 9/1985 | Beattie | E05G 1/024 220/88.1 |
| 4,616,104 A | * | 10/1986 | Lindsey | H02G 3/125 174/650 |
| 4,667,840 A | * | 5/1987 | Lindsey | H02G 3/088 220/3.3 |
| 4,721,227 A | * | 1/1988 | Hughes | E05G 1/024 109/78 |
| 5,069,358 A | * | 12/1991 | Avery, Jr. | G11B 33/04 29/469 |
| 5,438,162 A | * | 8/1995 | Thompson | H05K 7/1417 174/547 |
| 5,636,744 A | * | 6/1997 | Hirose | B65D 81/025 206/592 |
| 6,105,334 A | * | 8/2000 | Monson | F21V 25/00 52/28 |
| 6,230,877 B1 | * | 5/2001 | Sandberg | F42B 39/14 206/524.1 |
| 6,252,167 B1 | * | 6/2001 | Rose | H02G 3/088 220/241 |
| 6,752,092 B2 | * | 6/2004 | Beattie | E05G 1/024 109/74 |
| 6,874,295 B2 | * | 4/2005 | Anderson | H02G 3/12 52/407.3 |
| 7,628,113 B2 | * | 12/2009 | Pallo | E05G 1/024 220/592.2 |
| 7,670,033 B2 | * | 3/2010 | Steer | F21V 15/01 362/267 |
| 8,079,465 B2 | * | 12/2011 | Edwards | F42B 39/26 206/317 |
| 8,093,495 B2 | * | 1/2012 | Rupp | H02G 3/0412 439/535 |
| 8,858,727 B2 | * | 10/2014 | Jerg | A47L 15/4287 134/57 D |
| 2003/0021924 A1 | * | 1/2003 | Sakamoto | E05G 1/024 428/35.2 |
| 2004/0020925 A1 | * | 2/2004 | Anderson | H02G 3/12 220/3.2 |
| 2005/0174721 A1 | | 8/2005 | Chevallier et al. | |
| 2005/0188825 A1 | | 9/2005 | Sharpe et al. | |
| 2005/0205281 A1 | * | 9/2005 | Bachinski | H02G 3/088 174/50 |
| 2006/0070319 A1 | * | 4/2006 | Flynn | F16L 5/04 52/220.8 |
| 2007/0006723 A1 | | 1/2007 | Waddell, Jr. et al. | |
| 2007/0131684 A1 | * | 6/2007 | Cirillo | F42B 39/14 220/88.1 |
| 2009/0166052 A1 | * | 7/2009 | Rupp | H02G 3/0412 174/50 |
| 2009/0235507 A1 | * | 9/2009 | Cashin | F42D 5/045 29/402.08 |
| 2010/0307327 A1 | * | 12/2010 | Gettle | F41H 5/0442 89/36.02 |
| 2014/0352568 A1 | | 12/2014 | Benson | |
| 2015/0274394 A1 | * | 10/2015 | Hofmann | B65D 81/022 220/560.01 |
| 2016/0091141 A1 | * | 3/2016 | Gehlhausen | B65D 81/38 220/560.01 |
| 2016/0096671 A1 | * | 4/2016 | Canington, Jr. | B65D 81/02 220/560.01 |
| 2019/0366135 A1 | * | 12/2019 | Münzenberger | H02G 3/0412 |
| 2020/0362180 A1 | * | 11/2020 | Singh | C09K 21/02 |
| 2021/0359433 A1 | * | 11/2021 | Aguilar | H01R 9/2408 |

FOREIGN PATENT DOCUMENTS

| | | |
|---|---|---|
| DE | 19520698 A1 | 12/1996 |
| DE | 102009059946 A1 | 6/2011 |
| EP | 2597663 A1 | 5/2013 |

OTHER PUBLICATIONS

International Search Report and Written Opinion of the International Searching Authority for PCT/GB2018/050568, dated May 16, 2018 (Electricity North West Limited) May 16, 2018.
Examination Report for Australian patent application No. 2018265349 (Electricity North West Property Limited) dated Nov. 11, 2019.
Examination Report for European patent application No. 18711997.9 (Electricity North West Property Limited) dated May 21, 2021.
Examination Report for Australian patent application No. 2018265349 (Electricity North West Property Limited) dated Apr. 8, 2020.

* cited by examiner

METHOD OF IMPROVING AN ELECTRICAL LINK BOX

FIELD OF THE INVENTION

This application relates to a method of improving an electrical link box and an improved electrical link box. In particular, this application relates to a method of improving an electrical link box and an improved electrical link box, wherein the improvements provide safer electrical link boxes.

SUMMARY

According to a first aspect there is provided a method of improving an electrical link box, the method including steps of:
opening the electrical link box to provide access to a space within the electrical link box;
inserting an electrical link box safety improving container into the space in the electrical link box; and
closing the electrical link box;
wherein the electrical link box safety improving container contains a filling material for mitigating blasts in the electrical link box.

The method may further include a step of determining a volume of the space in the electrical link box and selecting an electrical link box safety improving container with a volume which is less than and/or similar to the volume of the space in the electrical link box for insertion into the electrical link box.

The volume of the electrical link box safety improving container may be at least:
50% of the volume of the space in the electrical link box; or
60% of the volume of the space in the electrical link box; or
70% of the volume of the space in the electrical link box; or
80% of the volume of the space in the electrical link box; or
85% of the volume of the space in the electrical link box; or
90% of the volume of the space in the electrical link box; or
95% of the volume of the space in the electrical link box; or
97% of the volume of the space in the electrical link box.

The volume of the electrical link box safety improving container may be at most:
95% of the volume of the space in the electrical link box; or
90% of the volume of the space in the electrical link box; or
85% of the volume of the space in the electrical link box.

The volume of filling material may be at least:
50% of the volume of the space in the electrical link box; or
60% of the volume of the space in the electrical link box; or
70% of the volume of the space in the electrical link box; or
80% of the volume of the space in the electrical link box; or
85% of the volume of the space in the electrical link box; or
90% of the volume of the space in the electrical link box; or
95% of the volume of the space in the electrical link box; or
97% of the volume of the space in the electrical link box.

The volume of the filling material may be at most:
95% of the volume of the space in the electrical link box; or
90% of the volume of the space in the electrical link box; or
85% of the volume of the space in the electrical link box.

The electrical link box safety improving container selected may be dimensioned to leave a gap around a periphery of the electrical link box of at most:
10% of a length and/or a width of an opening of the electrical link box and/or a depth of the electrical link box; or
8% of a length and/or a width of an opening of the electrical link box and/or a depth of the electrical link box; or
6% of a length and/or a width of an opening of the electrical link box and/or a depth of the electrical link box.

The electrical link box safety improving container selected may be dimensioned to leave a gap around the periphery of the electrical link box of at least:
1% of a length and/or a width of an opening of the electrical link box and/or a depth of the electrical link box; or
2% of a length and/or a width of an opening of the electrical link box and/or a depth of the electrical link box; or
4% of a length and/or a width of an opening of the electrical link box and/or a depth of the electrical link box; or
5% of a length and/or a width of an opening of the electrical link box and/or a depth of the electrical link box.

The electrical link box safety improving container and the filling material may have a mass of at least:
5 kg; or
10 kg; or
15 kg; or
18 kg; and/or said mass may be at most:
20 kg; or
25 kg.

The electrical link box safety improving container may have a length of at least:
650 mm; or
700 mm; and/or said length may be at most:
1000 mm; or
1200 mm.

The electrical link box safety improving container may have a width of at least:
420 mm; or
500 mm; or
700 mm; and/or said width may be at most:
1000 mm; or
1200 mm.

The electrical link box safety improving container may have a depth of at least:
30 mm; or
50 mm; or
70 mm; and/or said depth may be at most:
150 mm; or
130 mm; or
100 mm.

The electrical link box safety improving container may include:
- an outer layer for holding the filling material; and
- a handle for inserting, positioning and removing the electrical link box safety improving container in or from an electrical link box.

The outer layer may be flexible.

The outer layer may be flame retardant.

The outer layer may include a thermoplastic coated thermosetting polymer.

The outer layer may be substantially liquid permeable.

The electrical link box safety improving container may include an inner layer positioned within the outer layer.

The inner layer may hold the filling material.

The inner layer may be liquid permeable.

The inner layer may be flame retardant.

The inner layer may have a thermal conductivity of between 0.14 W/mK and 0.17 W/m K.

The inner layer may be formed from a flexible plastics material.

The inner layer may be formed from thermoplastic.

The electrical link box safety improving container may be openable and reclosable for permitting access to the filling material.

The electrical link box safety improving container may be openable and reclosable by a zip fastener.

The filling material may have a density of at least:
- 250 kgm$^{-3}$; or
- 300 kgm$^{-3}$; or
- 800 kgm$^{-3}$; and/or the filling material may have a density of at most:
- 900 kgm$^{-3}$; or
- 1550 kgm$^{-3}$; or
- 1700 kgm$^{-3}$.

The filling material may have a water absorption capacity of at most 40% by weight.

The filling material may be flame retardant.

The filling material may have a thermal conductivity of between 0.29 W/mK and 0.58 W/mK.

The filling material may have an internal honeycomb structure.

At least a portion of the filling material may be in granular form.

The portion by volume of the filling material that is in granular form may be at least:
- 50%; or
- 60%; or
- 70%; or
- 80%; or
- 90%.

The granules may be generally spherical.

The granules may have a diameter of at least:
- 4 mm; or
- 7 mm; or
- 10 mm; and/or the granules may have a diameter of at most:
- 14 mm; or
- 20 mm; or
- 25 mm.

The filling material may be or may include a lightweight aggregate.

The filling material may include pelletised pulverised fuel ash.

The filling material may include Lytag®.

The filling material may include lightweight expanded clay.

The filling material may include Leca®.

The electrical link box safety improving container may be a bag.

The method may include a step of removing a safety blanket from the electrical link box.

There is also provided an electrical link box improving container according to the first aspect of the invention.

There is also provided an electrical link box including the electrical link box safety improving container.

There is also provided a kit for making the electrical link box safety improving container.

BRIEF DESCRIPTION OF THE DRAWINGS

Embodiments will now be described by way of example only with reference to the accompanying drawings, in which.

DESCRIPTION OF EMBODIMENTS

Referring to the figures, there is shown a method of improving an electrical link box 10. The method includes opening the electrical link box 10 to provide access to a space 12 within the electrical link box 10, and then inserting an electrical link box safety improving container 20 into the space 12 in the electrical link box 10. The electrical link box 10 is then closed. The electrical link box 10 may be provided with a lid 14 to enable the electrical link box 10 to be closed after the electrical link box safety improving container 20 is inserted. The electrical link box safety improving container 20 contains a filling material 22 for mitigating blasts in the electrical link box 10.

Providing an electrical link box safety improving container 20 which contains a filling material 22 for mitigating blasts in the electrical link box 10 is advantageous. Electrical link boxes are commonly located in the ground in built up areas, e.g. under footpaths or roads. Due to electrical link boxes being located in the ground, in use, gas from the ground may accumulate in a space 12 within the electrical link box 10. Further, as electrical link boxes age they may become less reliable. It is difficult to replace electrical link boxes without causing significant disruption, both in terms of the physical restrictions on paths and roads. It can therefore be relatively expensive and time consuming to replace an electrical link box. It is also difficult to tell when an electrical link box may be about to fail, and so it is difficult to prioritise replacement of electrical link boxes. In some instances, when an electrical link box 10 fails electricity can arc within the electrical link box 10. This may cause any gas within the electrical link box 10 to ignite and thus cause a blast, or explosion, in the electrical link box 10. This blast can cause significant damage to the surrounding area, and may, for instance, injure passing people. This is, in particular, but not necessarily only, because the lid 14 of the electrical link box 10 may be projected violently upwardly when a blast occurs. This is due to the significant amount of force that may be produced by a blast. Further, a blast may start a fire. Advantageously, after installation the electrical link box safety improving container 20 occupies at least a portion of the space 12 within the electrical link box 10. This reduces the available space for gas to accumulate in, and thus reduces the size of any blast which occurs compared to a situation in which the container 20 is not present. Accordingly, the provision of the filling material 22 is advantageous as it reduces the amount of undesirable gas that can accumulate. Further, if a gas is ignited within the electrical link box 10 and the electrical link box safety improving container 20 is in situ with the filling material 22 contained therein, then the filling material 22 provides additional mass against which the blast must act. This additional mass mitigates against the blast by absorbing at least some of the energy from the blast. This results in the lid 14, for instance, not projecting upwardly in such a violent fashion thus improving the safety of the electrical link box 10. It will therefore be apparent that the safety improving container 20 and the filing material 22 together act in a two-fold synergistic way. First, the size of any blast may be reduced, and, second, the consequences of that smaller blast are further mitigated.

Figure 2:
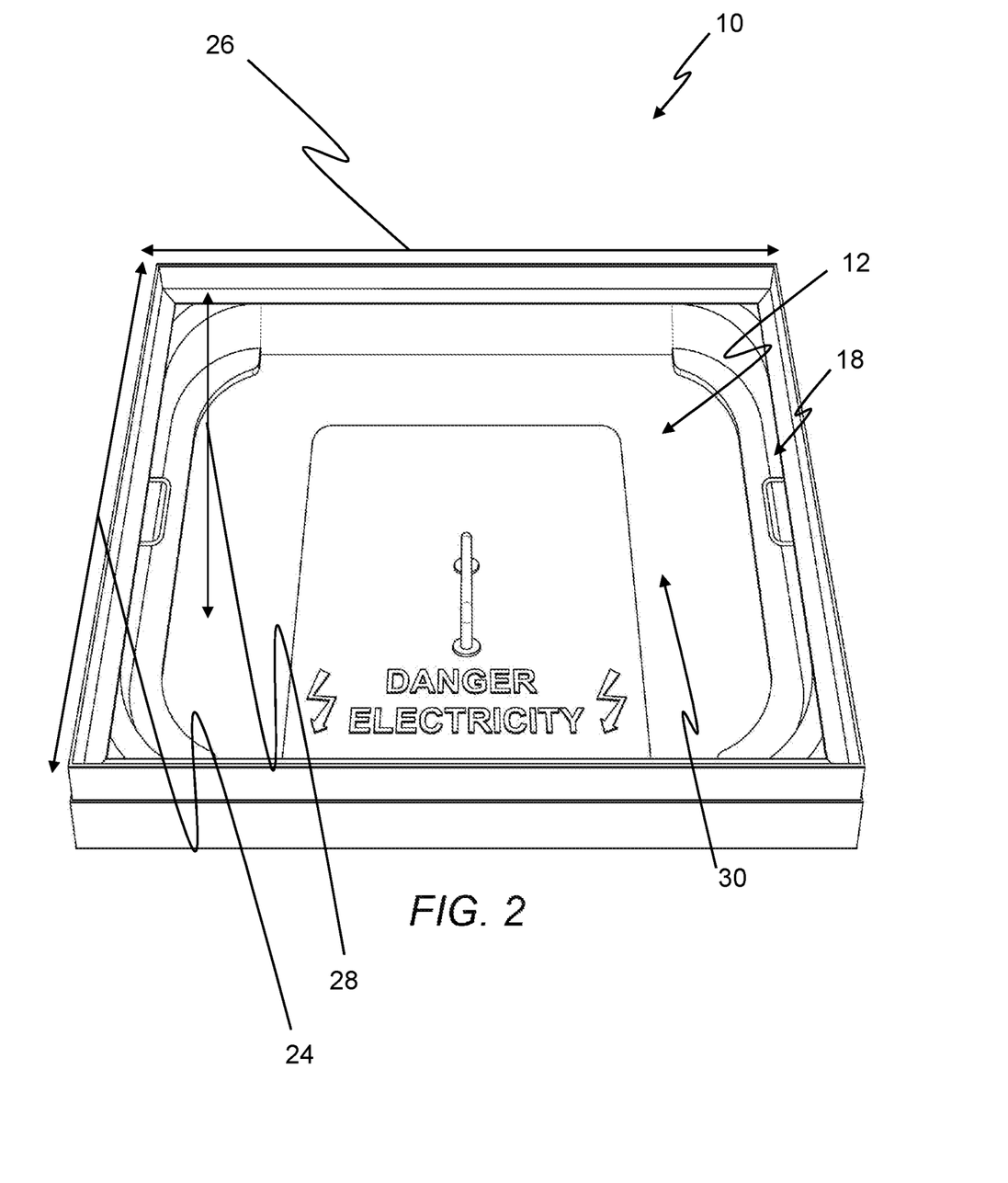
FIG. 2 is a perspective view of an electrical link box.

The method may include the further step of determining a volume of the space 12 in the electrical link box 10. This may be done on-site, for instance, by measurement of the space 12 to determine the volume of the space 12. It may also, or alternatively, be done off-site, for instance, by having a record of which electrical link boxes 10 are installed in which locations, and thus having a record of the volume of the space 12 within each electrical link box 10. For example, a link box may be known to be a 4 way or a 2 way link box of a standard size. An electrical link box safety improving container 20 may then be selected with a volume which is less than and/or similar to the volume of the space 12 in the electrical link box 10 for insertion into the electrical link box 10. This is advantageous because it ensures good fitment of the electrical link box safety improving container 20 in the electrical link box 10, thus improving the effectiveness of the electrical link box safety improving container 20. A good fitment allows the lid of the electrical link box 10 to be correctly replaced and also to fill a large amount of the space 12 within the electrical link box, thus reducing the possibility of gas build up. It also enables a fitter of the electrical link box safety improving container 20 to have the correct size electrical link box safety improving containers to hand to insert into each of the electrical link boxes 10 they are to improve.

Figure 1:
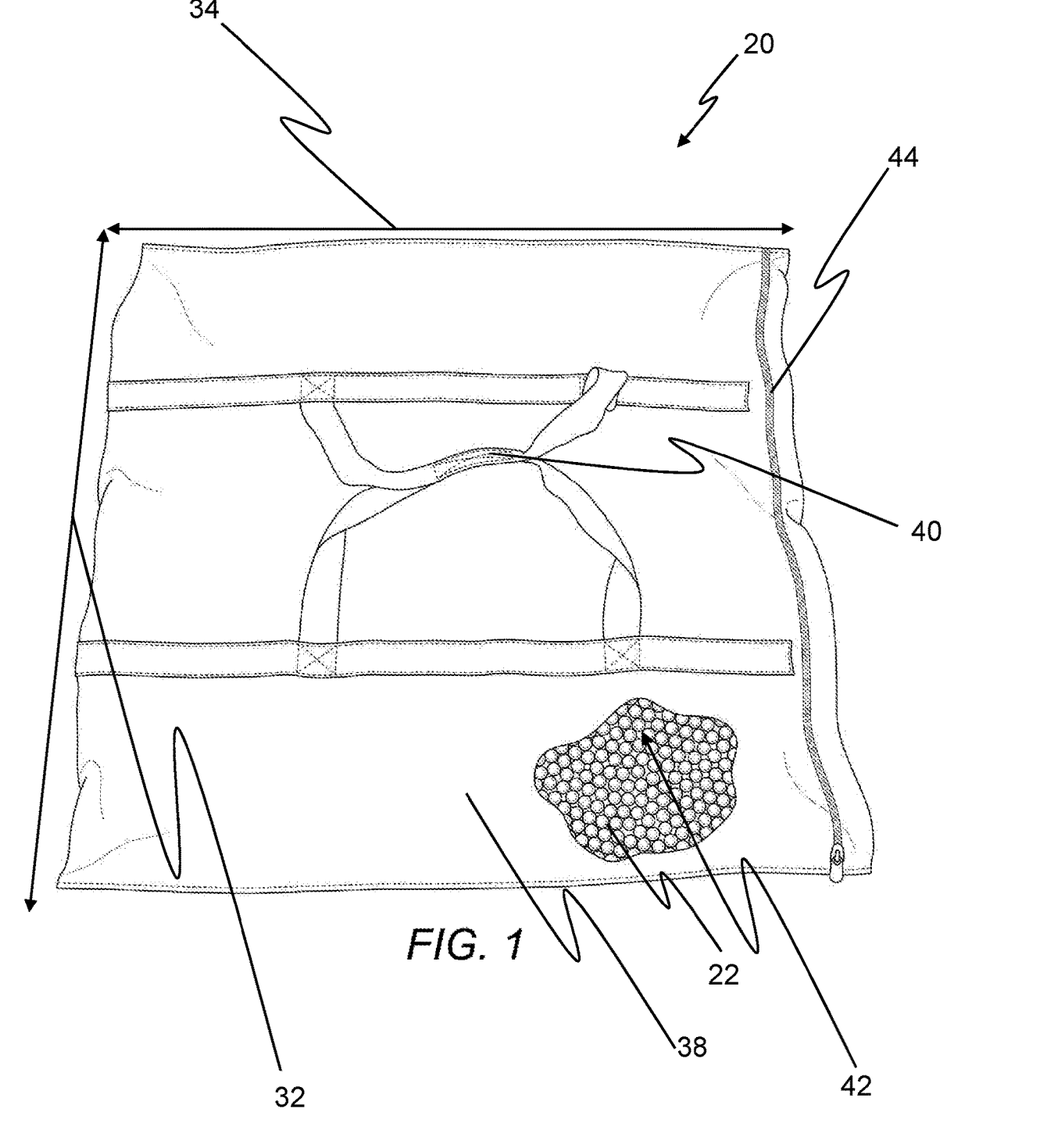
FIG. 1 is a perspective view of an electrical link box improving container.

The volume of the electrical link box safety improving container 20 may be at least 50% of the volume of the space 12 in the electrical link box 10; or 60% of the volume of the space 12 in the electrical link box 10; or 70% of the volume of the space 12 in the electrical link box 10; or 80% of the volume of the space 12 in the electrical link box 10; or 85% of the volume of the space 12 in the electrical link box 10; or 90% of the volume of the space 12 in the electrical link box 10; or 95% of the volume of the space 12 in the electrical link box 10; or 97% of the volume of the space 12 in the electrical link box 10. The volume of the electrical link box safety improving container 20 may be at most 95% of the volume of the space 12 in the electrical link box 10; or 90% of the volume of the space 12 in the electrical link box 10; or 85% of the volume of the space 12 in the electrical link box 10. Providing an electrical link box safety improving container 20 that occupies at least 50% of the volume of the space 12 in the electrical link box 10 may be advantageous because it ensures that a significant proportion of the space 12 within the electrical link box 10 is occupied with an inert material thus reducing the available space for flammable substances, such as gases, to occupy.

The volume of filling material 22 may be at least 50% of the volume of the space 12 in the electrical link box 10; or 60% of the volume of the space 12 in the electrical link box 10; or 70% of the volume of the space 12 in the electrical link box 10; or 80% of the volume of the space 12 in the electrical link box 10; or 85% of the volume of the space 12 in the electrical link box 10; or 90% of the volume of the space 12 in the electrical link box 10; or 95% of the volume of the space 12 in the electrical link box 10; or 97% of the volume of the space 12 in the electrical link box 10. The volume of the filling material may be at most 95% of the volume of the space 12 in the electrical link box 10; or 90% of the volume of the space 12 in the electrical link box 10; or 85% of the volume of the space 12 in the electrical link box 10. Providing a volume of filling material 22 that may occupy at least 50% if the volume of the space 12 in the electrical link box 10 may be advantageous. Providing such a volume of filling material 22 provides a significant mass of material against which a blast must act. Thus, the filling material 22 absorbs at least some of the energy from the blast and reduces the energy available for projecting the lid 14 upwardly. Providing such a volume of filling material 22 is also advantageous because the filling material 22 occupies a significant proportion of the space 12 meaning that there is less space within the electrical link box 10 for gas to build up. Therefore, the risk of a blast occurring may be reduced and/or the consequences of any blast that does occur may be reduced.

The filling material 22 may fill at least 70% of the electrical link box safety improving container 20; or 75% of the electrical link box safety improving container 20; or 80% of the electrical link box safety improving container 20; or 85% of the electrical link box safety improving container 20; or 90% of the electrical link box safety improving container 20; or 95% of the electrical link box safety improving container 20. The filling material 22 may fill at most 97% of the electrical link box safety improving container 20; or 95% of the electrical link box safety improving container 20; or 90% of the electrical link box safety improving container 20; or 85% of the electrical link box safety improving container 20. This may be advantageous in permitting one size of electrical link box safety improving container 20 to be used in many different sized electrical link boxes 10 so that only size of electrical link box safety improving container 20 needs to be carried by the fitter and the appropriate volume of filling material 22 can be filled into the electrical link box safety improving container 20 for that electrical link box 10.

Figure 3:
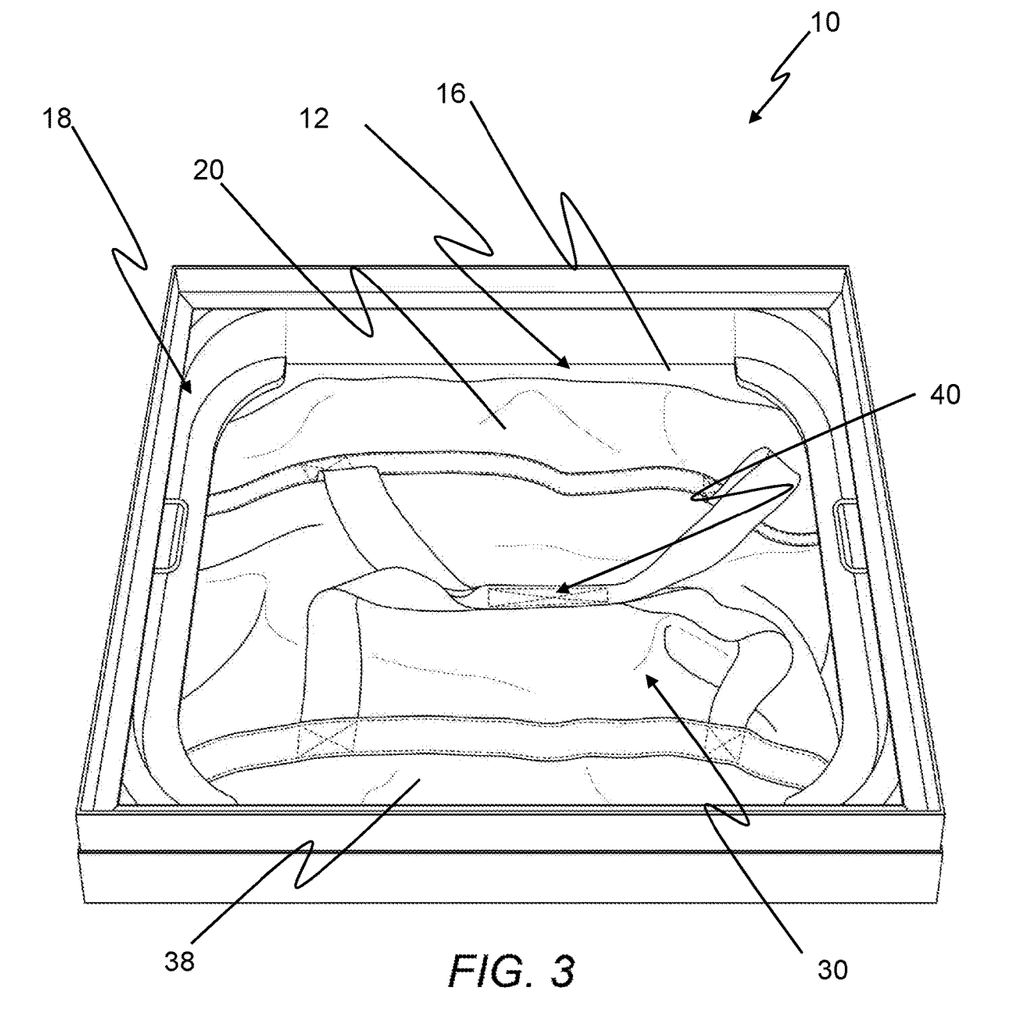
FIG. 3 is a perspective view of an electrical link box in which the container of FIG. 1 has been inserted.
Figure 4:
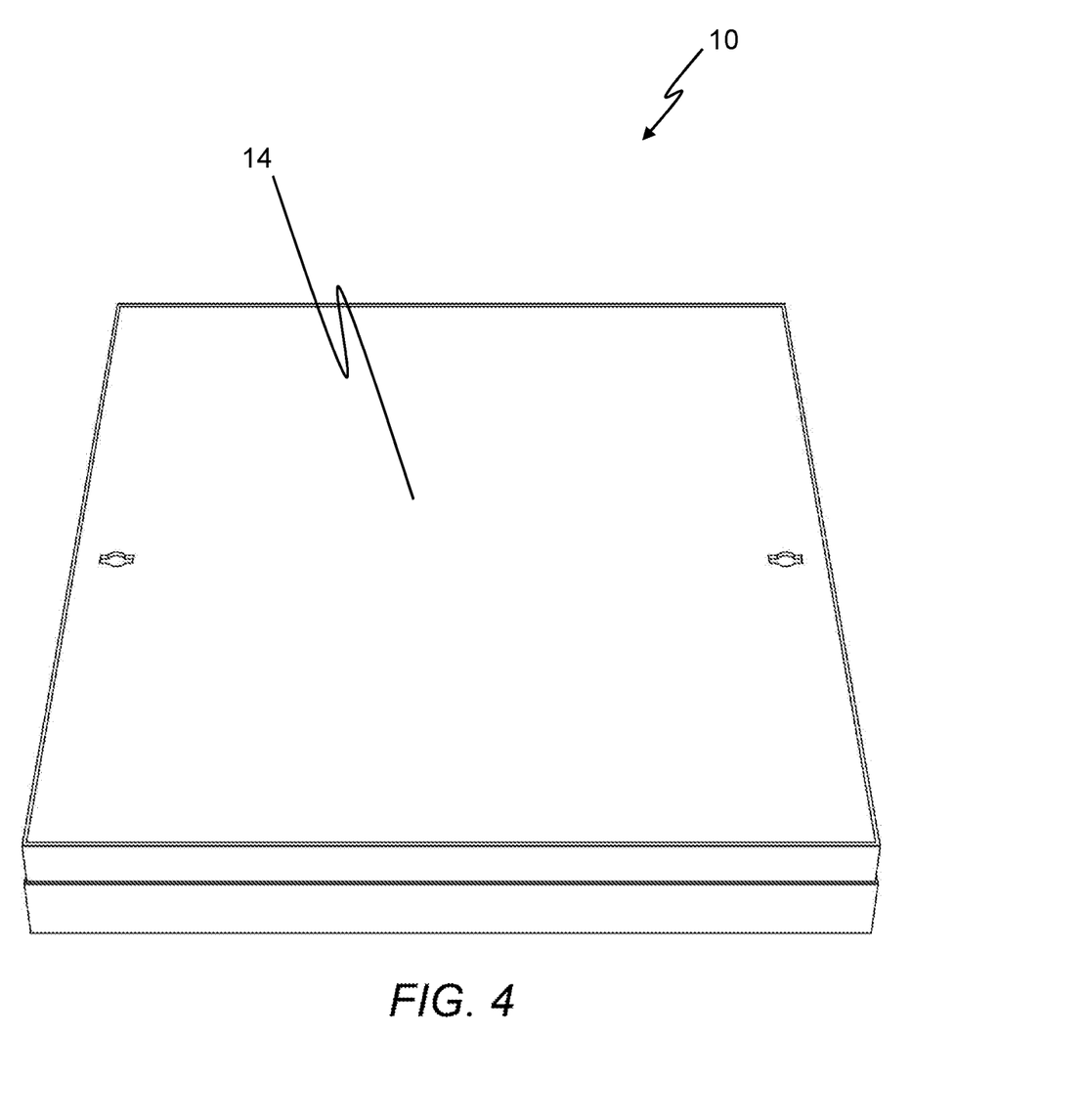
FIG. 4 is a perspective view of an embodiment of an improved electrical link box.

The electrical link box safety improving container 20 selected may be dimensioned to leave a gap 16 around a periphery 18 of the electrical link box 10 of at most 10% of a length 24 and/or a width 26 of an opening 30 of the electrical link box 10 and/or a depth 28 of the electrical link box 10; or 8% of a length 24 and/or a width 26 of an opening 30 of the electrical link box 10 and/or a depth 28 of the electrical link box 10; or 6% of a length 24 and/or a width 26 of an opening 30 of the electrical link box 10 and/or a depth 28 of the electrical link box 10. The electrical link box safety improving container 20 selected may be dimensioned to leave a gap 16 around the periphery 18 of the electrical link box 10 of at least 1% of a length 24 and/or a width 26 of an opening 30 of the electrical link box 10 and/or a depth 28 of the electrical link box 10; or 2% of a length 24 and/or a width 26 of an opening 30 of the electrical link box 10 and/or a depth 28 of the electrical link box 10; or 4% of a length 24 and/or a width 26 of an opening 30 of the electrical link box 10 and/or a depth 28 of the electrical link box 10; or 5% of a length 24 and/or a width 26 of an opening 30 of the electrical link box 10 and/or a depth 28 of the electrical link box 10. This may be advantageous because it ensures that the electrical link box safety improving container 20 fits relatively snugly in the space 12 thus ensuring that there is a minimal gas build up within the electrical link box 10, thus reducing the risk of a blast occurring and/or reducing the consequences of any blast that does occur.

The electrical link box safety improving container 20 and the filling material 22 may have a mass of at least 5 kg; or 10 kg; or 15 kg; or 18 kg. The electrical link box safety improving container 20 and the filling material may have a mass of at most 20 kg; or 25 kg. Providing an electrical link box safety improving container 20 and filling material 22 having such a mass may be advantageous. It has been found that providing a relatively heavy electrical link box safety improving container 20 and filling material 22 assists in mitigating against any blast that may occur as the container 20 and filling material 22 are able to absorb at least some of the energy from the blast meaning that less energy is available to damage the area surrounding the electrical link box 10.

The electrical link box safety improving container 20 may have a length 32 of at least 650 mm; or 700 mm. The electrical link box safety improving container 20 may have a length 32 of at most 1000 mm; or 1200 mm.

The electrical link box safety improving container 20 may have a width 34 of at least 420 mm; or 500 mm; or 700 mm. The electrical link box safety improving container 20 may have a width 34 of at most 1000 mm; or 1200 mm.

The electrical link box safety improving container 20 may have a depth (not shown) of at least 30 mm; or 50 mm; or 70 mm. The electrical link box safety improving container 20 may have a depth of at most 150 mm; or 130 mm; or 100 mm.

Providing an electrical link box safety improving container 20 having dimensions as listed above may be advantageous. By providing electrical link box safety improving containers 20 of different dimensions it is possible to select an electrical link box safety improving container 20 of a suitable size to fit a specific electrical link box 10. It also enable multiple electrical link box safety improving containers 20 to be inserted into an electrical link box 10 to fit around the components within the electrical link box 10. This ensures good fitment of the electrical safety improving containers 20 into the electrical link box 10 and provides more efficient safety measures against gas accumulation and blast mitigation.

The electrical link box safety improving container 20 may include an outer layer 38 for holding the filling material 22. The electrical link box safety improving container 20 may include a handle 40 for inserting, positioning and removing the electrical link box safety improving container 20 in or from an electrical link box 10. The handle 40 may be advantageous in assisting a user to remove an electrical link box safety improving container 20 from an electrical link box 10 so that they may inspect the electrical link box 10 and then easily replace the electrical link box safety improving container 20. In other words, the handle 40 may provide ease of use to a user and provide easy access to the electrical link box 10 by being easy to remove and replace.

The outer layer 38 may be flexible. This may be advantageous in assisting easy fitment of the electrical link box safety improving container 20 into the electrical link box 10. This is because the electrical link box safety improving container 20 may be deformable to permit the filling material 22 to move within the electrical link box safety improving container 20 and thus deform to be able to occupy the space 12 available within the electrical link box 10.

The outer layer 38 may be flame retardant. The outer layer 38 may be or include a thermoplastic coated thermosetting polymer. This may be advantageous in the event of a blast as it may prevent the electrical link box safety improving container 20 from breaking and releasing the filling material 22. It may also assist in suffocating a fire underneath the electrical link box safety improving container 20 and thus reduce the risk presented by a failing electrical link box 10.

The outer layer 38 may be substantially liquid permeable. This may be advantageous because any liquid that accumulates in the electrical link box 10 is able to permeate and flow through the electrical link box safety improving container 20 meaning that any liquid that accumulates in the electrical link box safety improving container 20 is able to drain effectively therefrom. This ensures that the performance of the electrical link box safety improving container 20 is not degraded by liquid retention.

Alternatively, the outer layer 38 may be substantially liquid impermeable. This may be advantageous in preventing the filling material 22 from becoming damp which may reduce its effectiveness.

The electrical link box safety improving container 20 may include an inner layer 42 positioned within the outer layer 38. This may be advantageous in improving the robustness of the electrical link box safety improving container 20 in the event that the outer layer 38 is damaged.

The inner layer 42 may hold the filling material 22. This may be advantageous because in the event that the outer layer 38 is damaged the filling material is still held by the inner layer 42.

The inner layer 42 may be liquid permeable. This may be advantageous because any liquid that accumulates in the electrical link box 10 is able to permeate and flow through the electrical link box safety improving container 20 meaning that any liquid that accumulates in the electrical link box safety improving container 20 is able to drain effectively therefrom. This ensures that the performance of the electrical link box safety improving container 20 is not degraded by liquid retention. Liquid retention within link boxes is particularly disadvantageous, due to increased shock risks, increased corrosion and so on.

The inner layer 42 may be flame retardant. This may be advantageous in assisting with the extinguishing of any fire that may result from the ignition of gas build up in the electrical link box 10.

The inner layer 42 may have a thermal conductivity of between 0.14 W/mK and 0.17 W/m K.

The inner layer 42 may be formed from a flexible plastics material. In particular, the inner layer 42 may be formed from thermoplastic. This may be advantageous in assisting a user with inserting the electrical link box safety improving container 20 into the electrical link box 10. This is because the filling material 22 is able to move within the inner layer 42 which means that the filling material 22 is able to flow around the components within the electrical link box 10 to fill any space 12 within the electrical link box 10. This means that the electrical link box safety improving container 20 is able to fit more filling material 22 in it to occupy more space 12 in the electrical link box 10 to then reduce the space available for gas to occupy, thus improving the safety of the electrical link box 10.

The electrical link box safety improving container 20 may be openable and reclosable for permitting access to the filling material 22. In particular, the electrical link box safety improving container 20 may be openable and reclosable by a zip fastener 44. This may be advantageous for permitting the filling material 22 to be replaced or added to in the electrical link box safety improving container 20 to enable the same outer layer 38 and inner layer 42 to be used in a variety of different electrical link boxes 10 which require different amounts of filling material 22. Further, the amount of filling material 22 within the container 20 may be adjusted on site, thus enabling the container 20 to occupy large volumes of the space 12.

The filling material 22 may have a density of at least 250 $kgm^{-3}$; or 300 $kgm^{-3}$; or 800 $kgm^{-3}$. The filling material 22 may have a density of at most 900 $kgm^{-3}$; or 1550 $kgm^{-3}$; or 1700 $kgm^{-3}$. Providing filling material 22 within these densities may be advantageous because the filling material 22 may provide sufficient mass to mitigate against any blasts that may occur once installed in the electrical link box 10 but it may also be light enough to enable a user to easily insert and remove the electrical link box safety improving container 20 from the electrical link box 10.

The filling material 22 may have a water absorption capacity of at most 40% by weight. Preferably, the filling material 22 may have a water absorption capacity of at most 35% by weight. Most preferably, the filling material 22 may have a water absorption capacity of at most 30% by weight. This may be advantageous as electrical link boxes 10 can flood meaning that the filling material 22 will, in use, be exposed to water. By providing a filling material 22 that has a water absorption capacity of at most 40%, preferably 35% and most preferably 30%, by weight the filling material 22 will be able to withstand such flooding of the electrical link box 10.

The filling material 22 may be flame retardant. This is advantageous in the event that the filling material 22 is exposed to fire due to gas igniting in the electrical link box 10 as the filling material 22 will not fuel the fire. The filling material 22 may also assist in preventing the fire from spreading further.

The filling material 22 may have a thermal conductivity of between 0.29 W/mK and 0.58 W/mK. Preferably the filling material 22 may have a thermal conductivity of 0.35 W/m K.

The filling material 22 may have an internal honeycomb structure. This may be advantageous in providing the filling material with additional strength so that it remains intact in the event that a blast occurs. This is advantageous because the filling material may then be reused, even if the electrical link box safety improving container 20 is damaged.

At least a portion of the filling material 22 may be in granular form. The portion by volume of the filling material that is in granular form may be at least 50%; or 60%; or 70%; or 80%; or 90%. Alternatively, or additionally, the filling material 22 may be in pellet form. This may be advantageous as the pellet form provides a rounder shape which may permit the filling material 22 to flow more freely. In other words, the granules may be generally spherical. Providing the filling material 22 as granules may be advantageous in permitting the filling material 22 to flow and occupy space 12 in the electrical link box 10, when inserted therein, whilst providing a relatively compact and dense filling material.

The granules may have a diameter of at least 4 mm; or 7 mm; or 10 mm. The granules may have a diameter of at most 14 mm; or 20 mm; or 25 mm. Providing granules having a diameter as listed above may be advantageous. This is because the granules are large enough that they are prevented from compacting together and thus not moving into the space 12 available, but are small enough that there is limited dead space between the granules.

The filling material 22 may be or may include a lightweight aggregate. By this we mean that the filling material may be a material that has a lower density compared to traditional aggregate materials, such as stones used in the manufacture of concrete.

The filling material 22 may include potash.

The filling material 22 may include pelletised pulverised fuel ash. In particular, the filling material 22 may include Lytag®.

The filling material 22 may include lightweight expanded clay. By lightweight, we mean that the density of the expanded clay is less than traditional clay. In particular, the filling material 22 may include Leca®.

The electrical link box safety improving container 20 may be a bag. This may be advantageous in permitting the electrical link box safety improving container to occupy irregular shaped spaces whilst occupying a maximum volume of that space.

The method may include a further step of removing a safety blanket from the electrical link box. This may be advantageous in improving the blast mitigation safety measures utilised in the electrical link box 10. In particular, such prior art blankets may disadvantageously accumulate water within link boxes and removing such a blanket can reduce the potential for water to accumulate within the link box.

The electrical link box safety improving container 20 may be provided as a kit. The kit may be provided with instructions for how to make an electrical link box safety improving container 20 as described above. This may be advantageous in assisting users to produce electrical link box safety improving containers suitable for individual electrical link boxes 10. The instructions may further include instructions for carrying out a method described herein.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:

1. A method of improving an electrical link box including reducing the probability of and/or consequences of a blast, the method comprising the steps of:
   opening the electrical link box to provide access to a space within the electrical link box;
   inserting an electrical link box safety improving container into the space in the electrical link box; and
   closing the electrical link box;
   wherein the electrical link box safety improving container contains a filling material for mitigating blasts in the electrical link box, and the electrical link box safety improving container is deformable so as to permit the filling material to move within the electrical link box safety improving container and thus deform to occupy space within the electrical link box, and
   wherein a volume of the electrical link box safety improving container is at least 50% of a volume of the space in the electrical link box.

2. The method according to claim 1, wherein the volume of the electrical link box safety improving container is at least:
   60% of the volume of the space in the electrical link box; or 70% of the volume of the space in the electrical link box; or
80% of the volume of the space in the electrical link box; or
85% of the volume of the space in the electrical link box; or
90% of the volume of the space in the electrical link box; or
95% of the volume of the space in the electrical link box; or
97% of the volume of the space in the electrical link box.

3. The method according to claim 1, wherein a volume of filling material is at least:
50% of the volume of the space in the electrical link box; or
60% of the volume of the space in the electrical link box; or
70% of the volume of the space in the electrical link box; or
80% of the volume of the space in the electrical link box; or
85% of the volume of the space in the electrical link box; or
90% of the volume of the space in the electrical link box; or
95% of the volume of the space in the electrical link box; or
97% of the volume of the space in the electrical link box.

4. The method according to claim 1, wherein the electrical link box safety improving container selected is dimensioned to leave a gap around a periphery of the electrical link box of at most:
10% of a length and/or a width of an opening of the electrical link box and/or a depth of the electrical link box; or
8% of a length and/or a width of an opening of the electrical link box and/or a depth of the electrical link box; or
6% of a length and/or a width of an opening of the electrical link box and/or a depth of the electrical link box.

5. The method according to claim 1, wherein the electrical link box safety improving container and the filling material have a mass of at least:
5 kg; or
10 kg; or
15 kg; or
18 kg; and/or said mass is at most:
20 kg; or
25 kg.

6. The method according to claim 1, wherein the electrical link box safety improving container includes:
an outer layer for holding the filling material; and
a handle for inserting, positioning, and removing the electrical link box safety improving container in or from an electrical link box.

7. The method according to claim 6, wherein the outer layer:
is flexible;
is flame retardant;
is or includes a thermoplastic coated thermosetting polymer; and/or
is substantially liquid permeable.

8. The method according to claim 6, wherein the electrical link box safety improving container includes an inner layer positioned within the outer layer.

9. The method according to claim 8, wherein the inner layer:
holds the filling material;
is liquid permeable;
is flame retardant;
has a thermal conductivity of between 0.14 W/mK and 0.17 W/mK;
is formed from a flexible plastics material; and/or
is formed from thermoplastic.

10. The method according to claim 1, wherein the electrical link box safety improving container is openable and recloseable for permitting access to the filling material.

11. The method according to claim 1, wherein the filling material has a density of at least:
250 $\text{kgm}^{-3}$; or
300 $\text{kgm}^{-3}$; or
800 $\text{kgm}^{-3}$; and/or the filling material has a density of at most:
900 $\text{kgm}^{-3}$; or
1550 $\text{kgm}^{-3}$; or
1700 $\text{kgm}^{-3}$.

12. The method according to claim 1, wherein the filling material has a water absorption capacity of at most 40% by weight.

13. The method according to claim 1, wherein the filling material is flame retardant.

14. The method according to claim 1, wherein the filling material has a thermal conductivity of between 0.29 W/mK and 0.58 W/mK.

15. The method according to claim 1, wherein the filling material has an internal honeycomb structure.

16. The method according to claim 1, wherein at least a portion of the filling material is in granular form and wherein the portion by volume of the filling material that is in granular form is at least:
50%; or
60%; or
70%; or
80%; or
90%.

17. The method according to claim 16, wherein the granules have a diameter of at least:
4 mm; or
7 mm; or
10 mm; and/or the granules have a diameter of at most:
14 mm; or
20 mm; or
25 mm.

18. The method according to claim 1, wherein the filling material is or includes a lightweight aggregate.

19. The method according to claim 1, wherein the filling material includes pelletised pulverised fuel ash.

20. The method according to claim 1, wherein the filling material includes lightweight expanded clay.

21. An electrical link box comprising:
an electrical link box safety improving container positioned within a space within the electrical link box,
wherein the electrical link box safety improving container contains a filling material for mitigating blasts in the electrical link box, and the electrical link box safety improving container is deformable so as to permit the filling material to move within the electrical link box safety improving container and thus deform to occupy space within the electrical link box, and wherein a volume of the electrical link box safety improving container is at least 50% of a volume of the space in the electrical link box.

\* \* \* \* \*